(12) United States Patent
Zaifman et al.

(10) Patent No.: US 11,444,877 B2
(45) Date of Patent: Sep. 13, 2022

(54) PACKET FLOW IDENTIFICATION WITH REDUCED DECODE OPERATIONS

(71) Applicant: AT&T Intellectual Property I, L.P., Atlanta, GA (US)

(72) Inventors: Arthur L. Zaifman, Millburn, NJ (US); John Mark Mocenigo, Philadelphia, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/356,166

(22) Filed: Mar. 18, 2019

(65) Prior Publication Data
US 2020/0304415 A1 Sep. 24, 2020

(51) Int. Cl.
*H04L 47/2483* (2022.01)
*H04L 43/026* (2022.01)
*H04L 69/22* (2022.01)

(52) U.S. Cl.
CPC ........ *H04L 47/2483* (2013.01); *H04L 43/026* (2013.01); *H04L 69/22* (2013.01)

(58) Field of Classification Search
CPC ....... H04L 43/12; H04L 43/026; H04L 45/38; H04L 69/22; H04L 47/2441; H04L 43/022; H04L 43/04; H04L 43/08; H04L 43/106; H04L 43/028; H04L 45/745; H04L 47/10; H04L 45/586; H04L 49/70; H04L 41/14; H04L 43/0852; H04L 45/08; H04L 45/70; H04L 43/14; H04L 45/74; H04L 69/16; H04L 47/2483; H04L 63/1408; H04L 67/10; H04L 12/64; H04L 41/0823; H04L 43/0876; H04L 43/16; H04L 45/00; H04L 45/34; H04L 45/64; H04L 47/125; H04L 47/20; H04L 49/25; H04L 49/351; H04L 63/1416; H04L 67/1097; H04L 67/16; H04L 67/2804; H04L 67/42; H04L 69/324; H04L 41/142; H04L 43/062; H04L 45/50; H04L 47/127; H04L 47/15; H04L 47/2416; H04L 47/31; H04L 47/32; H04L 49/254; H04L 69/161; H04L 69/28;

(Continued)

(56) References Cited

U.S. PATENT DOCUMENTS 6,697,871 B1 * 2/2004 Hansen .................... H04L 69/22 370/392
6,971,028 B1 * 11/2005 Lyle ....................... G06F 21/554 709/224

(Continued)

*Primary Examiner* — Greg C Bengzon (57) ABSTRACT

In one example, a processing system including at least one processor may obtain a first packet, determine a first tunnel identifier from a tunnel identifier field and a first source port identifier from a source port identifier field of the header of the first packet, and assign the first packet to a first flow. The processing system may further obtain a second packet, extract a first value from a tunnel identifier field and a second value from a source port identifier field of a header of the second packet, determine that the first value matches the first tunnel identifier and that the second value matches the first source port identifier, and assign the second packet to the first flow in response to the determining that the first value matches the first tunnel identifier and that the second value matches the first source port identifier.

18 Claims, 4 Drawing Sheets

(58) Field of Classification Search
CPC ............. H04L 12/4633; H04L 12/4641; H04L 12/4645; H04L 25/03101; H04L 29/12924; H04L 41/046; H04L 41/0668; H04L 41/0806; H04L 41/12; H04L 41/145; H04L 41/147; H04L 41/50; H04L 43/06; H04L 43/0829; H04L 43/0882; H04L 43/10; H04L 45/306; H04L 45/308; H04L 45/60; H04L 47/70; H04L 49/3009; H04L 61/6063; H04L 63/02; H04L 63/0209; H04L 63/0263; H04L 63/0272; H04L 63/105; H04L 63/1441; H04L 69/166; H04L 12/413; H04L 12/4625; H04L 12/467; H04L 2012/5661; H04L 2012/5675; H04L 2212/00; H04L 29/06027; H04L 41/0213; H04L 41/22; H04L 41/28; H04L 41/5022; H04L 41/5058; H04L 43/00; H04L 43/02; H04L 43/024; H04L 43/0835; H04L 45/58; H04L 45/72; H04L 45/7453; H04L 47/11; H04L 47/12; H04L 47/2475; H04L 47/30; H04L 47/34; H04L 47/36; H04L 47/741; H04L 49/206; H04L 49/208; H04L 49/3036; H04L 49/9057; H04L 63/0227; H04L 63/029; H04L 63/1425; H04L 63/1433; H04L 63/306; H04L 65/1063; H04L 65/607; H04L 65/80; H04L 67/02; H04L 67/1006; H04L 67/1095; H04L 67/142; H04L 67/22; H04L 69/163; H04L 9/3297; G06F 15/16; G06F 21/552; G06F 13/122; G06F 13/4022; G06F 2009/45587; G06F 2009/45591; G06F 2009/45595; G06F 9/45533; G06F 9/45558; H04W 24/08; H04W 28/0215
See application file for complete search history.

(56) References Cited

U.S. PATENT DOCUMENTS

| | | | | |
|---|---|---|---|---|
| 8,160,089 | B1* | 4/2012 | Padiyar | H04L 12/413 370/445 |
| 8,428,087 | B1* | 4/2013 | Vincent | H04L 69/22 370/474 |
| 8,705,365 | B1* | 4/2014 | Martin | H04L 47/10 370/232 |
| 8,804,507 | B2* | 8/2014 | Assarpour | H04L 47/6215 370/230 |
| 8,817,622 | B1* | 8/2014 | Miller | H04L 12/413 370/235 |
| 8,824,285 | B1* | 9/2014 | Reith, III | H04L 41/142 370/230 |
| 8,954,601 | B1* | 2/2015 | Patro | H04L 45/38 709/238 |
| 9,979,624 | B1* | 5/2018 | Volpe | H04L 43/0894 |
| 10,003,515 | B1* | 6/2018 | Whiteside | H04L 43/026 |
| 10,033,613 | B1* | 7/2018 | Whiteside | H04L 43/0882 |
| 10,097,464 | B1* | 10/2018 | Conlon | H04L 47/125 |
| 10,321,360 | B2* | 6/2019 | Mahapatra | H04L 67/146 |
| 10,623,308 | B2* | 4/2020 | Singh | H04L 45/38 |
| 2001/0055274 | A1* | 12/2001 | Hegge | H04L 43/026 370/229 |
| 2002/0144156 | A1* | 10/2002 | Copeland, III | H04L 63/1408 726/22 |
| 2004/0003094 | A1* | 1/2004 | See | H04L 43/14 709/227 |
| 2004/0049596 | A1* | 3/2004 | Schuehler | H04L 69/16 709/238 |
| 2005/0111381 | A1* | 5/2005 | Mukherjee | H04N 21/8455 370/254 |
| 2006/0143300 | A1* | 6/2006 | See | H04L 43/026 709/227 |
| 2007/0121615 | A1* | 5/2007 | Weill | H04L 47/20 370/389 |
| 2007/0276952 | A1* | 11/2007 | Mitchell | H04L 69/22 709/230 |
| 2008/0137855 | A1* | 6/2008 | Enomoto | H04L 63/0428 380/255 |
| 2009/0175353 | A1* | 7/2009 | Suh | H04N 19/132 375/240.25 |
| 2010/0095064 | A1* | 4/2010 | Aviles | H04L 67/1097 711/118 |
| 2010/0125900 | A1* | 5/2010 | Dennerline | H04L 63/0227 726/13 |
| 2010/0319071 | A1* | 12/2010 | Ganacharya | H04L 63/1416 726/24 |
| 2011/0069632 | A1* | 3/2011 | Chen | H04L 43/026 370/253 |
| 2011/0110220 | A1* | 5/2011 | Breslin | H04L 43/04 370/216 |
| 2011/0149793 | A1* | 6/2011 | Kim | H04L 43/026 370/253 |
| 2012/0155397 | A1* | 6/2012 | Shaffer | H04W 28/044 370/329 |
| 2013/0262703 | A1* | 10/2013 | Dong | H04L 43/026 709/247 |
| 2014/0050223 | A1* | 2/2014 | Foo | H04L 45/74 370/400 |
| 2014/0119377 | A1* | 5/2014 | Crosta | H04L 45/7453 370/392 |
| 2014/0301394 | A1* | 10/2014 | Arad | G06F 16/214 370/392 |
| 2015/0016279 | A1* | 1/2015 | Zhang | H04L 45/745 370/250 |
| 2015/0016298 | A1* | 1/2015 | Ganichev | H04L 43/0894 370/253 |
| 2015/0016460 | A1* | 1/2015 | Zhang | H04L 49/70 370/392 |
| 2015/0078398 | A1* | 3/2015 | McKenney | H04L 49/90 370/417 |
| 2015/0085694 | A1* | 3/2015 | Agarwal | H04L 43/0876 370/253 |
| 2015/0127823 | A1* | 5/2015 | Moeller | H04W 72/0453 709/224 |
| 2015/0131666 | A1* | 5/2015 | Kang | H04L 45/745 370/392 |
| 2015/0146718 | A1* | 5/2015 | Wang | H04L 45/70 370/389 |
| 2015/0215841 | A1* | 7/2015 | Hsu | H04W 12/12 370/328 |
| 2015/0281099 | A1* | 10/2015 | Banavalikar | H04L 12/4641 370/230 |
| 2015/0341271 | A1* | 11/2015 | Cortes Gomez | H04L 41/042 370/236 |
| 2016/0134534 | A1* | 5/2016 | Tan | H04L 45/02 370/392 |
| 2016/0135074 | A1* | 5/2016 | Welin | H04W 12/03 370/235 |
| 2016/0191384 | A1* | 6/2016 | Shelar | H04L 45/38 370/392 |
| 2016/0269482 | A1* | 9/2016 | Jamjoom | H04L 43/0852 |
| 2016/0294732 | A1* | 10/2016 | Chou | H04L 45/38 |
| 2016/0299775 | A1* | 10/2016 | Madapurath | H04L 12/4633 |
| 2016/0352601 | A1* | 12/2016 | Zhang | H04L 41/0645 |
| 2017/0034049 | A1* | 2/2017 | Pfaff | H04L 45/38 |
| 2017/0180249 | A1* | 6/2017 | Shen | G06F 9/45558 |
| 2017/0180272 | A1* | 6/2017 | Bernath | H04L 49/3054 |
| 2017/0324632 | A1* | 11/2017 | Arora | H04L 63/1441 |
| 2017/0346731 | A1* | 11/2017 | Pukhraj Jain | H04L 12/4633 |
| 2017/0353478 | A1* | 12/2017 | Ishikawa | H04L 12/4666 |
| 2017/0359264 | A1* | 12/2017 | Bird | H04L 43/106 |
| 2018/0019945 | A1* | 1/2018 | Donley | H04L 45/58 |
| 2018/0048593 | A1* | 2/2018 | Tian | H04L 41/0813 |
| 2018/0063178 | A1* | 3/2018 | Jadhav | H04L 45/74 |
| 2018/0069793 | A1* | 3/2018 | Narayanan | H04L 47/215 |
| 2018/0097722 | A1* | 4/2018 | Callard | H04L 45/38 |

(56) References Cited

U.S. PATENT DOCUMENTS

| | | | |
|---|---|---|---|
| 2018/0167296 A1* | 6/2018 | Behera | H04L 43/062 |
| 2018/0191835 A1* | 7/2018 | Saldanha | H04L 67/142 |
| 2018/0234360 A1* | 8/2018 | Narayana | H04L 69/166 |
| 2018/0241664 A1* | 8/2018 | Singh | H04L 45/38 |
| 2018/0367422 A1* | 12/2018 | Raney | H04L 43/12 |
| 2019/0044856 A1* | 2/2019 | Fischetti | H04L 45/742 |
| 2019/0124043 A1* | 4/2019 | Xu | H04L 65/1033 |
| 2019/0149445 A1* | 5/2019 | Kelley, Jr. | H04L 41/5058 709/224 |
| 2019/0149512 A1* | 5/2019 | Sevinc | H04L 63/0236 726/11 |
| 2019/0173851 A1* | 6/2019 | Jain | H04L 9/0637 |
| 2019/0230039 A1* | 7/2019 | Wang | H04L 49/354 |
| 2019/0364492 A1* | 11/2019 | Azizi | H04W 48/10 |
| 2020/0382421 A1* | 12/2020 | K. | H04L 43/026 |

\* cited by examiner

FIG. 1

```
▼ Internet Protocol Version 6, Src: 2001:506:421f:c1e8::2:301:2 (2001:506:421f:c1e8::2:301:2), Dst: 2600:300:2070:3ff::2 (2600:300:2070:3ff::2)
    0110 .... = Version: 6              201
    .... 0101 1000 .... .... .... = Traffic class: 0x58 (DSCP: AF23, ECN: Not-ECT)
    .... .... .... 0000 0000 0000 0000 = Flow label: 0x00000
    Payload length: 79
    Next header: UDP (17)      202
    Hop limit: 249
    Source: 2001:506:421f:c1e8::2:301:2 (2001:506:421f:c1e8::2:301:2)       203
    Destination: 2600:300:2070:3ff::2 (2600:300:2070:3ff::2)         204
    [Source GeoIP: Unknown]
    [Destination GeoIP: Unknown]
▼ User Datagram Protocol, Src Port: gtp-user (2152), Dst Port: gtp-user (2152)
    Source Port: gtp-user (2152)
    Destination Port: gtp-user (2152)
    Length: 79
    Checksum: 0x4297 [unverified]
    [Checksum Status: Unverified]
    [Stream index: 6]
▼ GPRS Tunneling Protocol
    ▶ Flags: 0x30
    Message Type: T-PDU (0xff)
    Length: 63        205
    TEID: 0x842648a1
    T-PDU Data: 4500003ff7c100000ff117c300a4ee6fba:1a2601f3480035...
▼ Internet Protocol Version 4, Src: 10.78.238.251 (10.78.238.251), Dst: 172.26.38.1 (172.26.38.1)
    0100 .... = Version: 4          206
    .... 0101 = Header length: 20 bytes (5)
    ▶ Differentiated Services Field: 0x00 (DSCP: CS0, ECN: Not-ECT)
    Total Length: 63
    Identification: 0x7c18 (31768)
    ▶ Flags: 0x00
    Fragment offset: 0
    Time to live: 255        207
    Protocol: UDP (17)
    Header checksum: 0x7c30 [validation disabled]
    [Header checksum status: Unverified]          208
    Source: 10.78.238.251 (10.78.238.251)
    Destination: 172.26.38.1 (172.26.38.1)        209
    [Source GeoIP: Unknown]
    [Destination GeoIP: Unknown]
▼ User Datagram Protocol, Src Port: 62200 (62200), Dst Port: domain (53)
    Source Port: 62200 (62200)       210
    Destination Port: domain (53)     211
```

PACKET FLOW IDENTIFICATION WITH REDUCED DECODE OPERATIONS

The present disclosure relates generally to network packet analysis, and more particularly to devices, computer-readable media, and methods for assigning packets to a flow in a telecommunication network.

BACKGROUND

Network packet analysis may involve obtaining data packets in transit via a telecommunication network and assigning the packets to respective flows. For instance, each flow may be defined by a 5 tuple of source Internet Protocol (IP) address, destination IP address, source port, destination port, and protocol. In one example, the packets, e.g., user/data plane IP packets, may be encapsulated in several protocol layers which may be associated with multiple headers. Thus, to characterize each packet and to assign each packet to a respective flow may involve numerous operations to decapsulate the various protocol data unit (PDU) headers, or header field, and obtain information from the respective headers, or header fields.

SUMMARY

The present disclosure broadly discloses devices, non-transitory (i.e., tangible or physical) computer-readable storage media, and methods for assigning packets to a flow in a telecommunication network. For instance, in one example, a processing system including at least one processor may obtain a first packet, determine a first tunnel identifier from a tunnel identifier field of a header of the first packet and a first source port identifier from a source port identifier field of the header of the first packet, and assign the first packet to a first flow. The processing system may further obtain a second packet, extract a first value from a tunnel identifier field of a header of the second packet and a second value from a source port identifier field of the header of the second packet, determine that the first value matches the first tunnel identifier and that the second value matches the first source port identifier, and assigning the second packet to the first flow in response to the determining that the first value matches the first tunnel identifier and that the second value matches the first source port identifier.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure relate to network packet analysis and avoid a heavy per-packet cost associated with blindly parsing every network packet that may be encountered by a packet analyzer. Examples of the present disclosure may use time-compression, mobile device kernel IP stack operations, and packet header rewrite to improve the performance of packet analyzers. This significantly improves the performance of packet analysis on dense processor configurations. Examples of the present disclosure are also equipped to handle the expected exponential increases in network traffic volumes which may accompany the adoption of 5G technologies. In one aspect, the present disclosure utilizes a reduced number of fields in the network packet header to determine packet-to-flow membership in conjunction with a defined time window for performing the matching. These and other aspects of the present disclosure are discussed in greater detail below in connection with the examples of FIGS. 1-4.

Figure 1:
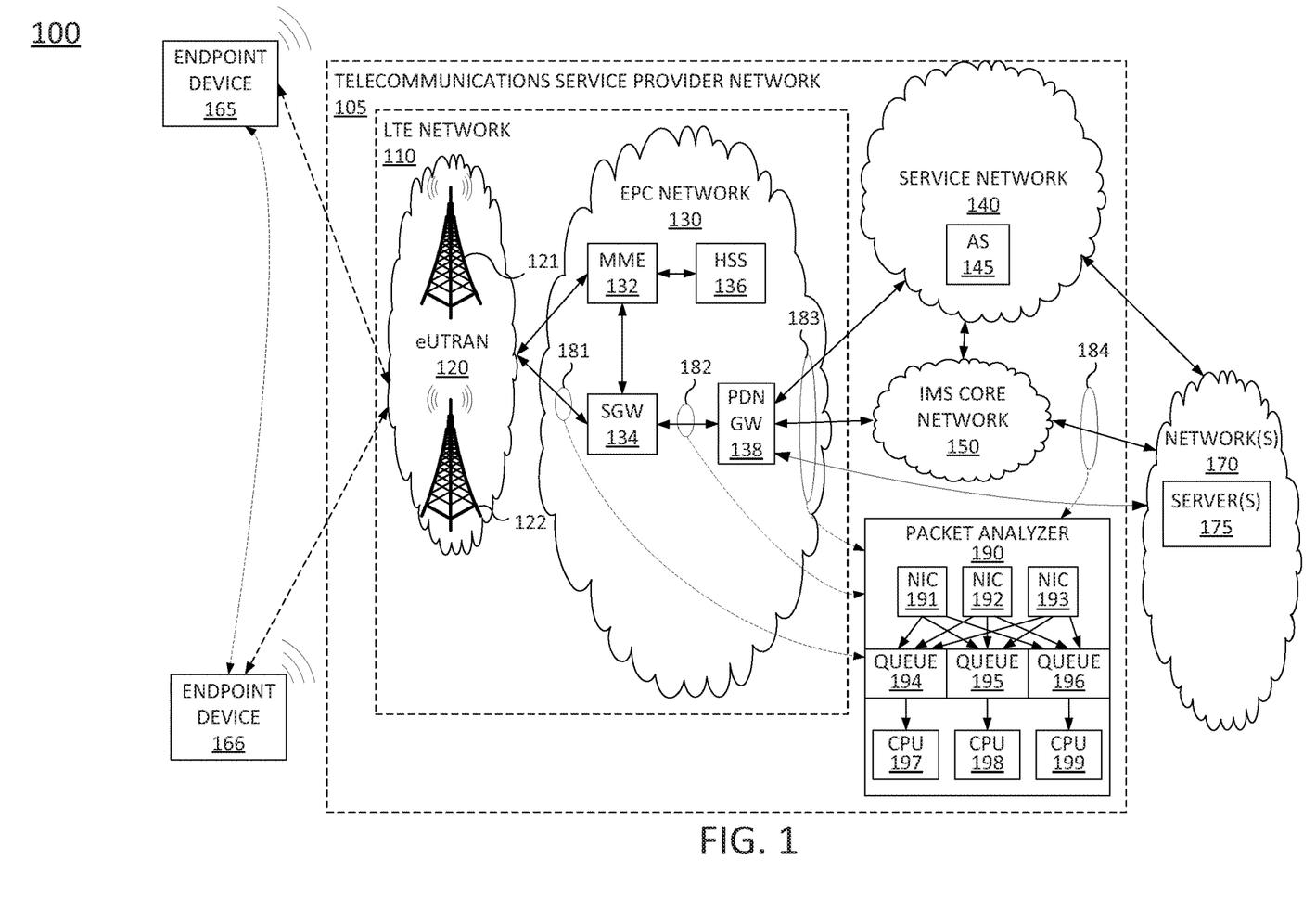
FIG. 1 illustrates an example of a system including a telecommunication service provider network, according to the present disclosure.

FIG. 1 illustrates an example network, or system 100 that may implement or support examples of the present disclosure for assigning packets to a flow in a telecommunication network. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint devices 165 and 166 with devices, e.g., servers 175 in networks 170, application server 145 in service network 140, etc., with other endpoint devices (not shown) and/or with other components of telecommunications service provider network 105.

As illustrated in FIG. 1, each of the endpoint devices 165 and 166 may comprise, for example, a cellular telephone, a smartphone, a tablet computing device, a laptop computer, a wireless enabled wristwatch, or any other wireless and/or cellular-capable mobile telephony and computing devices (broadly, a "mobile endpoint device"). In one example, endpoint devices 165 and 166 may be equipped for cellular and non-cellular wireless communication. For instance, endpoint device 165 and 166 may include components which support peer-to-peer and/or short range wireless communications. Thus, each of the endpoint devices 165 and 166 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

In addition, in one example, endpoint devices 165 and 166 may comprise all or a portion of a computing device or system, such as computing system 400, and/or processing system 402 as described in connection with FIG. 4 below, specifically configured to perform various steps, functions, and/or operations in connection with examples of the present disclosure for assigning packets to a flow in a telecommunication network.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3rd Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UEs), such as endpoint device 165 and/or endpoint device 166, may access wireless services via the eNodeBs 121 and 122 located in eUTRAN 120. It should be noted that any number of eNodeBs can be deployed in an eUTRAN.

In EPC network 130, network devices such as Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 130 may comprise a Home Subscriber Server (HSS) 136 that contains subscription-related information (e.g., subscriber (or "user") profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices for providing services to subscribers, customers, and or users. For example, telecommunications service provider network 105 may provide a cloud storage service, a web server hosting service, and other services. As such, service network 140 may represent aspects of telecommunications service provider network 105 where infrastructure for supporting such services may be deployed. In the example of FIG. 1, service network 140 may include an application server (AS) 145. In one example, AS 145 may comprise all or a portion of a computing device or system, such as computing system 400, and/or processing system 402 as described in connection with FIG. 4 below, specifically configured to perform various steps, functions, and/or operations in connection with examples of the present disclosure for assigning packets to a flow in a telecommunication network, in accordance with the present disclosure.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of networks. As illustrated in FIG. 1, networks 170 include one or more servers 175 which may each comprise all or a portion of a computing device or system, such as computing system 400, and/or processing system 402 as described in connection with FIG. 4 below, specifically configured to perform various steps, functions, and/or operations in connection with examples of the present disclosure for assigning packets to a flow in a telecommunication network.

As further illustrated in FIG. 1, the telecommunications service provider network 105 may have a number of network observation points (NOPs), e.g., NOPs 181-184. The NOPs 181-184 may comprise, for example, passive optical splitters, or taps, which may copy traffic on respective optical links between components of the telecommunications service provider network 105. In examples where the links between components are not optical components (e.g., twisted pair copper cables, or the like), the NOPs may comprise similar devices to copy the traffic on the respective links. In one example, the NOPs 181-184 may copy traffic on the respective links and provide the traffic to a packet analyzer 190, e.g., an application server. The traffic may include data plane traffic (e.g., user/application data) and control plane traffic. For instance, the data plane traffic may comprise user/application data comprising packets to or from endpoint devices 165 and 166, e.g., communicating with a video server, a gaming server, a workspace collaboration server, etc., such as one of the servers 175, other cellular or non-cellular endpoint devices (not shown), and so on.

In one example, the present disclosure relates to packet analysis of data plane traffic. Thus, in one example, the NOPs may be deployed at locations which are suitable for obtaining data plane traffic. In one example, the data plane traffic may comprise packets (e.g., Internet Protocol (IP) packets) which may be further encapsulated in accordance with various protocols of various networking layers (e.g., in accordance with the OSI model, or the like). For instance, IP packets may convey user/application data as a payload and may have an IP header, as well as a header for a transport layer protocol data unit (PDU) (e.g., a segment for TCP, a datagram for UDP, etc.). In addition, the IP packets may be further encapsulated e.g., with a virtual local area network (VLAN) identifier (ID) header, a tunneling protocol header (e.g., a General Packet Radio Service (GPRS) tunneling protocol (GTP) header with a tunnel ID for packet transport in a mobility network, such as eUTRAN 102 and/or EPC network 130), an Ethernet frame, and Ethernet packet, and so on. As follows herein, the term packet may be understood to generally refer to the entire protocol data unit (PDU) (e.g., an Ethernet packet). In one example, the NOPs 181-184 may copy user plane traffic (packets) for the packet analyzer 190. In another example, the NOPs 181-184 may copy all traffic on a link, or traffic which may include traffic types other than data plane traffic. In such case, the packet analyzer 190 may initially filter for data plane traffic (packets).

The packet analyzer 190 may include a plurality of network interface cards (NICs) 191-193. In one example, the NICs 191-193 may be configured to inspect a received packet from one of the NOPs 181-184 and to calculate a hash on the received packet (e.g., over various header fields, such as source IP address, destination IP address, source port, and destination port). In one example, for each packet, the packet analyzer 190 may derive an index from the hash (such as using the "X" least significant bits (LSBs), e.g., 7 LSBs, 8 LSBs, etc.). Using the index derived from the hash for a packet, the packet analyzer 190 may place the packet into one of a plurality of queues (e.g., queues 194-196). For instance, up to 128 index values (e.g., using 8 LSBs) may be mapped to 16 queues, 8 queues, etc. For illustrative purposes, three queues 194-196 are illustrated in the example of FIG. 1. Notably, packets belonging to the same flow (e.g., sharing a 5 tuple) may have the same hash values, which may then share the same index value, and therefore all be placed into the same queue. Packets from multiple flows may be placed into the same queue, either due to sharing the same index value, or due to the index values being assigned to the same queue. The assignment of index values to queues may be based upon any number of criteria, such as random assignment, assignment to achieve load balancing, and so forth. Within each queue, packets may be placed in an order of arrival. Thus, later arriving packets copied from NOPs 181-184 may remain in queue behind earlier arriving packets, although the exact timing of the packets may not be preserved. It should be noted that the NICs 191-193 may perform these operations in hardware and may have no specific understanding of the flow to which a packet belongs. Thus, additional components of packet analyzer 190 may perform additional operations for flow matching/flow assignment.

In one example, each queue (e.g., queues 194-196) may be assigned to a respective processor for flow matching. For instance, queues 194-196 are each assigned to a respective central processing unit (CPU) 197-199, respectively. It should be noted that in the example of FIG. 1, the ratio of queues to processors (e.g., CPUs) is 1:1. However, in other examples, the number of available processors may be less than the number of queues. Thus, for instance, in another example queues 194 and 195 may both be assigned to CPU 197 and may be processed as separate threads on the same CPU 197.

In accordance with the present disclosure, packet analyzer 190 may comprise all or a portion of a computing device or system, such as computing system 400, and/or processing system 402 as described in connection with FIG. 4 below, specifically configured to perform various steps, functions, and/or operations in connection with examples of the present disclosure for assigning packets to a flow in a telecommunication network. An example method 300 for assigning packets to a flow in a telecommunication network is described in greater detail below in connection with FIG. 3.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

It should be noted that the foregoing description of packet analyzer 190 describes just one example configuration of a packet analyzer. It should therefore be understood that a packet analyzer in accordance with the present disclosure may take various forms, such as including more or less processors (e.g., CPUs), different kinds of processors, e.g., graphics processing units (GPUs), field programmable gate arrays (FPGAs), or other programmable logic devices (PLDs), as an alternative or in addition to CPUs, more or less NICs, and so forth. Similarly, a packet analyzer may receive packets from a single link or from multiple links in a network. Thus, in another example, each of NOPs 181-184 may be paired with a different packet analyzer. In addition, each of the multiple packet analyzers may submit packet processing results to a unified data storage system (not shown) for further use in various operations, such as threat analysis, traffic analysis, network planning, billing analysis, automatic network configuration (e.g., via software defined network (SDN) infrastructure), and so forth.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, service network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 121 and 122, PDN GW 138, AS 145, and other components of system 100 are also omitted for clarity.

In accordance with the present disclosure, any one or more of the components of EPC network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 132 may comprise a vMME, SGW 134 may comprise a vSGW, and so forth. In this regard, the EPC network 130 may be expanded (or contracted) to include more or less components than the state of EPC network 130 that is illustrated in FIG. 1. For instance, EPC network 130 may be expanded to include additional PDN gateways, e.g., in the form of vPGWs, additional serving gateways (SGWs), e.g., in the form of vSGWs, and so forth. In one example, the SDN host devices may be deployed in one or more geographically diverse data centers. Accordingly, in one example, the network may be segregated into a number of zones, where different VNFs may be deployed in different zones depending upon the respective locations of the one or more data centers.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, a 5G network and the like, an IEEE 802.11-based network, or a future technology or standard-based network, a network implementing various combinations of any one or more of the foregoing technologies, and so on). In one example, AS 145, servers 175, packet analyzer 190, and/or other components may comprise cloud-based and/or distributed data storage and/or processing systems comprising one or more servers at a same location or at different locations. However, for ease of illustration, these components are depicted as standalone devices in FIG. 1. In addition, although the AS 145 is illustrated as components of service network 140, the packet analyzer 190 is illustrated as a component of the telecommunications service provider network 105 in general, and so on, in other examples, any one or more of these components may be deployed in a different configuration. For instance, the packet analyzer 190 may comprise a component of LTE network 110, IMS core network 150, and so forth. Thus, these and other modifications are all contemplated within the scope of the present disclosure.

Figure 2:
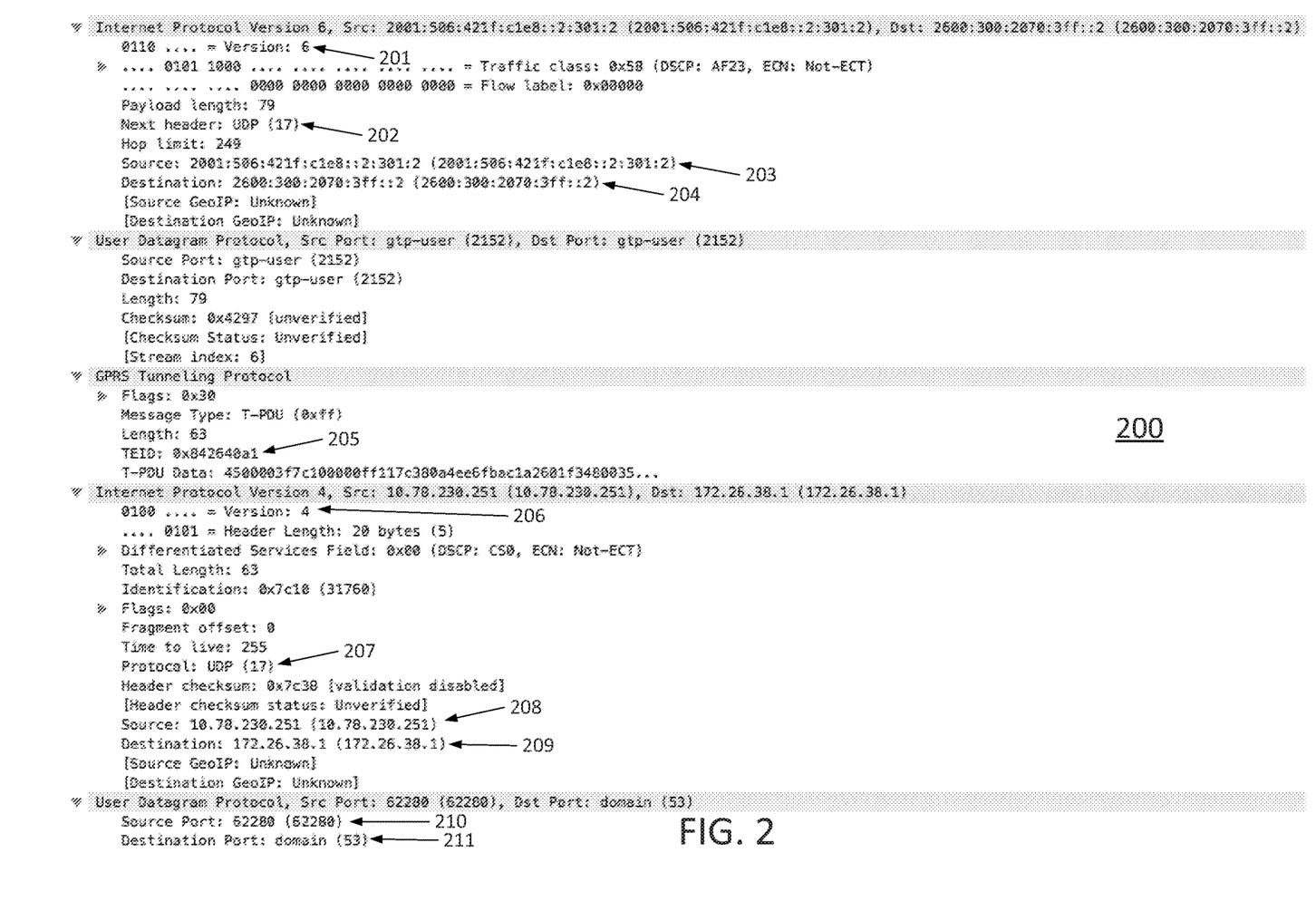
FIG. 2 illustrates an example packet including a plurality of headers, in accordance with the present disclosure.

To aid in understanding the present disclosure, FIG. 2 illustrates an example packet header 200. In a mobility network, a packet header may include fields for various protocols. For instance, an example packet header may be structured as: "erf:eth:ethertype:vlan:ethertype:ipv6:udp:gtp:ip:udp:dns." By blindly parsing each packet (e.g., by a packet analyzer, such as packet analyzer 190 of FIG. 1 and/or by a processor of packet analyzer), 11 decapsulations may be applied to each packet to extract the desired field values. The overhead associated with performing these decapsulations at 40 Gbps, for example, is high. For instance, in this case, billions of processor instructions may be executed each second just to perform these decapsulations. Examples of the present disclosure avoid a significant portion of these operations. To illustrate, a first packet for a flow that is encountered by a packet analyzer may be fully parsed and the relevant field values determined. For instance, as illustrated in the example packet header 200 of FIG. 2, e.g., an Ethernet packet header, there are 11 fields 201-211, from which relevant values may be determined. To obtain these field values may involve numerous processor instructions per packet, and billions per second, e.g., at a 40 Gbps packet/frame rates. Obtaining these field values allows the characterization of each packet and allows the determination of the flow to which each packet belongs, e.g., identified by the 5 tuple of source IP address (field 208), destination IP address (field 209), source port (field 210), destination port (field 211), and protocol (field 207).

Examples of the present disclosure determine flow membership of subsequent packets belonging to the same flow by extracting just two header field values: tunnel identifier (ID) (field 205) and source port (field 210). In one example, when the first packet encountered for a flow is decapsulated, the packet analyzer may determine an offset to the tunnel ID and source port ID fields (in addition to determining the tunnel ID and source port values). For instance, the offset for the tunnel ID field may comprise a number of data units from a start of the first packet to a start of a header field containing the tunnel ID. The data units may be measured in bits, bytes, etc. Similarly, the offset for the source port field may comprise a number of data units from a start of the first packet to a start of a header field containing the source port ID. However, in another example, the offset for the source port field could be the number of data units from the end of the header field for tunnel ID to the start of the header field for the source port ID. Utilizing these offsets, the packet analyzer may then scan subsequent packets to determine if the tunnel ID and source port ID values match. For instance, the tunnel ID may comprise a 32 bit value that follows starting from the offset for the tunnel ID determined from the first packet of the flow. Similarly, the source port ID may comprise a 16 bit value that follows starting from the offset for the source port field (or source port ID contained in the field) determined from the first packet of the flow. Notably, the packet analyzer does not necessarily have to decapsulate subsequent packets through various protocol layer headers. Rather, the packet analyzer may skip to the bit positions, byte positions, etc. where the tunnel ID and source port ID fields values may be expected and may compare the next 32 bits, for tunnel ID, and the next 16 bits, for source port ID, from the respective offset positions to stored values for the tunnel ID and source port ID from the first packet (and which define the flow). If there is a match for the values for both fields, a subsequent packet may be matched to the first packet and may be determined to belong to the same flow.

It should be noted that at any given time, a packet analyzer may have active rules in place for matching subsequent packets for a plurality of flows, where the rule may be defined as the tunnel ID and source port ID values to match, along with the tunnel ID and source port ID offsets which indicate where in the headers for subsequent packets to look for the matching values. Thus, the packet analyzer may attempt to match a subsequent packet to a first flow. If there is no match, the packet analyzer may attempt to match the subsequent packet to a second flow, and so forth. If the subsequent packet does not match any of the rules for existing flows, the subsequent packet may be determined to be the first packet of a new flow, and a matching rule may be implemented for this new flow (e.g., tunnel ID offset, tunnel ID (value), source port ID offset, source port ID (value)).

In one example, the present disclosure optimizes over a time window to account for field collision probabilities. A field collision may occur when two packets from two different flows have the same tunnel ID and source port ID combination. For instance, GTP protocol tunnel identifiers may have a random distribution within a value-range (e.g., a 32 bit field with 4 billion possible combinations). However, TCP/UDP port numbers may have a smaller value range (e.g., 16 bit with 64,000 possible combinations). In addition, the TCP/UDP port numbers may not be randomly assigned. For instance, certain protocols or traffic types may always or typically utilize a same port number. Thus, for widely utilized protocols, a substantial percentage of packets may have the same port numbers (or a defined range or set of port numbers, e.g., source port IDs), thereby increasing the likelihood of field collision.

Examples of the present disclosure may define a time window (a duration of time) over which a packet analyzer may attempt to match subsequent packets to an observed flow. For instance, at any network observation point (NOP), a field (F) may have a natural collision probability $P_{\{F1c,F2c\}}$ (two or more different flows will share the same field values) over some interval or duration $(D) = P_{\{F1c,F2c\}}(D)$. $P_{\{F1c,F2c\}}(D)$ decreases as D decreases when F is uniformly random. Thus, an operator of the packet analyzer may set the time window to achieve a preferred collision probability. In addition, in one example, the time window may be adjusted during operations as an observed number of collisions and/or a collision percentage exceeds the preferred collision probability. For instance, if too many collisions are observed, the time window, D, may be reduced, thereby decreasing the likelihood of field collision. Similarly, the time window, D, may be adjusted in response to the cost (or tax) reduction benefit changing. For example, as a result of something fundamental changing in the network, the number of operations saved by utilizing a particular time window may be reduced. Alternatively, or in addition, the number of fields utilized for flow detection may be increased, e.g., $P_{\{F1c, F2c, \ldots FNc\}}(D)$. However, this may increase the per-packet tax (processing burden) at the packet analyzer.

In one example, the foregoing operations may apply to processing packets in a queue, e.g., processing one of the queues 194-196 by one of the CPUs 197-199. For instance, each processor (CPUs 197-199) may process packets in a queue at 40 Gbps, while the NOPs 181-184 of FIG. 1 may copy packets at 100 Gbps, 200 Gbps, etc. Thus, for example, the number of known flows to which subsequent packets may be matched may be reduced as compared to utilizing a single queue, or a lesser number of queues. In one example, each processor processing a queue may maintain a plurality of rules for matching subsequent packets to known flows. In one example, after the time window, D, has passed without encountering a subsequent packet for the same flow, the processor may discard or release the matching rule for the flow. In other words, for a subsequent packet for the same flow, the packet may be decapsulated as a first packet of a flow to again determine the tunnel ID, source port ID, and offsets. In one example, e.g., where there are a large number of different flows being tracked by a processor, the matching rules for sparse flows may be discarded, e.g., keeping the matching rules for flows which are determined to have greater packet volumes and/or packet rates. The number of active matching rules to keep in place may be selected in accordance with an operator defined threshold and/or may be adjusted in accordance with a load at the packet analyzer, at a respective one of the processors, and so forth.

Figure 3:
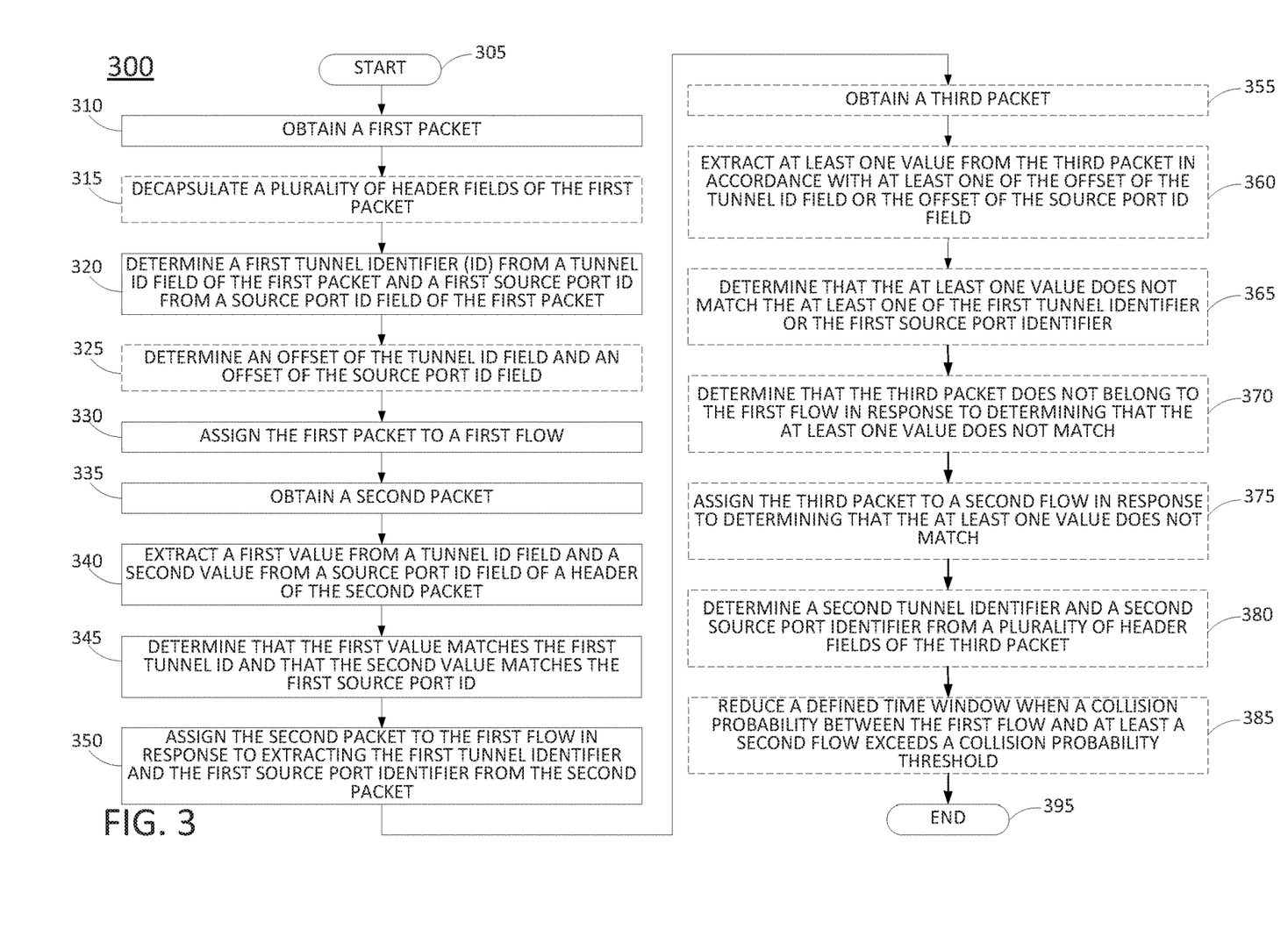
FIG. 3 illustrates a flowchart of an example method for assigning packets to a flow in a telecommunication network.

FIG. 3 illustrates a flowchart of an example method 300 for assigning packets to a flow in a telecommunication network. In one example, steps, functions and/or operations of the method 300 may be performed by a device as illustrated in FIG. 1, e.g., by packet analyzer 190, or any one or more components thereof, e.g., one or more of CPUs 197-199, or by packet analyzer 190 and/or any one or more components thereof in conjunction with one or more other components of the system 100, such as one or more of NOPs 181-184. In one example, the steps, functions, or operations of method 300 may be performed by a computing device or system 400, and/or a processing system 402 as described in connection with FIG. 4 below. For instance, the computing device 400 may represent at least a portion of a packet analyzer or other device(s) in accordance with the present disclosure. For illustrative purposes, the method 300 is described in greater detail below in connection with an example performed by a processing system, such as processing system 402. The method 300 begins in step 305 and may proceed to step 310.

At step 310, the processing system obtains a first packet. For example, the first packet may be obtained from a network tap deployed on at least one link of a telecommunication network. In one example, the first packet is hashed to a destination queue of a plurality of destination queues of the processing system, where the destination queue is assigned to a single thread of the processing system. Thus, in one example, the first packet may be obtained from such a queue.

At optional step 315, the processing system may decapsulate a plurality of header fields of the first packet. For instance, the processing system may process several header fields, such as a transport layer PDU header field, an IP header field, a virtual VLAN header field, a tunneling protocol header field, e.g., a GTP header field, and/or a tunneling identifier header field, an Ethernet frame header field, an Ethernet packet header field, and so on. The foregoing are just several of the example headers, or header fields, relating to various protocols and various networking layers that may be decapsulated and further processed in accordance with the present disclosure.

At step 320, the processing system determines a first tunnel identifier (ID) from a tunnel ID field of a header of the first packet and a first source port identifier (ID) from a source port ID field of the header of the first packet. In one example, the first tunnel ID comprises a GPRS tunnel ID, e.g., of a GTP header field. In one example, the first source port ID comprises a source port ID of a transport layer protocol header field, e.g., of a UDP header field or a TCP header field.

At optional step 325, the processing system may determine an offset of the tunnel ID field and an offset of the source port ID field. In one example, the offset of the tunnel ID field comprises a number of data units from a start of the first packet to a start of the tunnel ID field. The data units may be measured in bits, bytes, etc. Similarly, in one example, the offset of the source port ID field may comprise a number of data units from a start of the first packet to a start of the source port ID field. However, in another example, the offset for the source port ID field could be the number of data units from the end of the tunnel ID field to the start of the source port ID field.

At step 330, the processing system assigns the first packet to a first flow. In accordance with the present disclosure, the first flow is characterized by the first tunnel ID and the first source port ID. In one example, the processing system may then apply a rule to subsequent packets to determine if the subsequent packets match the flow. For instance, the rule may comprise the tunnel ID and source port ID. In one example, the rule may further include the offset of the tunnel ID field and the offset of the source port ID field to enable rapid scanning of subsequent packets for matching tunnel ID and source port ID values.

At step 335, the processing system obtains a second packet. In one example, the second packet is obtained from a network tap deployed on at least one link of the telecommunication network (e.g., the same network link from which the first packet may be obtained, or from a different link). In one example, the first packet and the second packet are hashed to a same destination queue of a plurality of destination queues of the processing system. In one example, the destination queue is assigned to a single thread of the processing system. For example, the first packet and second packet may also have the same hash and the same index (e.g., 7 least significant bits (LSBs) of the hash, 8 LSB, etc.) which is assigned to the queue. The queue may have more than one index/hash assigned thereto. For instance, 128 available indices using 7 LSBs of hash value may be assigned to 16 available queues, in one example.

At step 340, the processing system extracts a first value from a tunnel ID field of a header of the second packet and a second value from a source port ID field of a header of the second packet. In one example, the first value is extracted from the second packet using the offset of the tunnel ID field, and the second value is extracted from the second packet using the offset of the source port ID field determined at optional step 325. In one example, the extracting of the first value and the second value from the second packet is performed within a defined time window from the assigning of the first packet to the first flow. For instance, the time window may be set by an operator of the telecommunication network and/or may be automatically set/adjusted in response to various factors, such as a field collision probability.

At step 345, the processing system determines that the first value matches the first tunnel ID and that the second value matches the first source port ID. For instance, the processing system may perform a bitwise comparison to determine the equivalences.

At step 350, the processing system assigns the second packet to the first flow in response to determining that the first value matches the first tunnel ID and that the second value matches the first source port ID. For instance, where the first value is the first tunnel ID and the second value is the first source port ID, the two packets may be determined to belong to the same flow. For example, the first packet and the second packet may have the same 5 tuple (source IP address, destination IP address, source port, destination port, and protocol). However, in accordance with the present disclosure, the flow assignment determination may be shortened by using the tunnel ID and source port ID fields as described herein.

At optional step 355, the processing system may obtain a third packet, e.g., from the same or a different network tap as the first packet and/or the second packet. Similarly, the third packet may be obtained from a same queue in which the first packet and the second packet are also placed.

At optional 355, the processing system may extract at least one value from the third packet in accordance with at least one of: the offset of the tunnel ID field or the offset of the source port ID field. For instance, optional step 355 may comprise similar operations as described above in connection with optional step 340.

At optional 360, the processing system may determine that the at least one value does not match the at least one of the first tunnel ID or the first source port ID. For instance, if any of the bits (or bytes, etc.) is different, a non-match may be determined.

At optional 365, the processing system may determine that the third packet does not belong to the first flow in response to determining that the at least one value does not match the at least one of the first tunnel ID or the first source port ID. For instance, as described above, two packets may be determined to belong to the same flow when the values in the tunnel ID and source port ID headers or header fields match. Thus, when it is determined that at least one of the tunnel IDs or the source port IDs of two packets do not match, it may be determined that the packets are not part of the same flow.

At optional 370, the processing system may assign the third packet to a second flow in response to determining that the at least one value does not match the at least one of the first tunnel ID or the first source port ID. For example, the processing system may determine that the third packet is part of a new flow that has not yet been observed (or at least has not been observed within a defined time window for packet/flow matching).

At optional 375, the processing system may determine a second tunnel ID and a second source port ID from a plurality of header fields of the third packet, where the second flow is characterized by the second tunnel ID and the second source port ID. For example, optional step 375 may comprise the same or similar operations as described above in connection with step 320. In one example, optional step 375 may further include determining an offset of the second tunnel ID (e.g., a start of a tunnel ID field of a header of the third packet) and an offset of the second source port ID (e.g., a start of a source port ID field of the header of the third packet). For instance, the structure of the header of the third packet (and subsequent packets of the second flow, if any) may be different from a header structure of packets belonging to the first flow. Thus, for example, the start of a tunnel ID header field may have a different offset than for packets in the first flow (and similarly for the offsets of the source port ID fields of packets of the respective flows). It should be noted that the second source port ID is used herein as a label only. Thus, the second source port ID could be the same value as the first source port ID, but the third packet will still be determined to be part of a different flow due to the different tunnel ID (e.g., a different value from the tunnel ID header field).

At optional step 380, the processing system may reduce the defined time window when a collision probability between the first flow and at least a second flow exceeds a collision probability threshold. In one example, the collision probability comprises a rate at which packets from at least a second flow comprising the first tunnel ID and the first source port ID are detected within the defined time window (e.g., packets from a second flow, but which have the same tunnel ID and source port ID as packets of the first flow). For instance, when the actual number or percentage of observed collisions exceeds a threshold, the defined time window may be reduced. Alternatively, or in addition, when an estimate (e.g., the collision probability) based upon the observed number or percentage of collisions exceeds a threshold, the defined time window may be reduced. Notably, a shorter time window may reduce the collision probability, thus helping to ensure that packets are uniquely assigned to the respective flows.

Following step 350 or any one or more of optional steps 355-385, the method 300 proceeds to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-350, steps 335-380, etc. For example, the method 300 may continue to match additional packets to the first flow, to determine that other packets are not matched to the first flow, and so on. In one example, the method 300 may be expanded to include hashing, indexing, and assigning packets to one of a plurality of queues. In one example, the method 300 may further include automatic network configuration, e.g., instantiating, reconfiguring, and/or decommissioning VNFs via SDN infrastructure of the telecommunication network, adjusting bandwidth assignments or bandwidth reservations for various clients, services, or the like over one or more network links, rerouting traffic, applying additional traffic filtering to specific flows or groups of flows having certain characteristics, such as flows from a particular region, from a particular source, to a particular destination or region, flows of a particular application or application type (e.g., streaming video, gaming, etc.), and so forth. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 4:
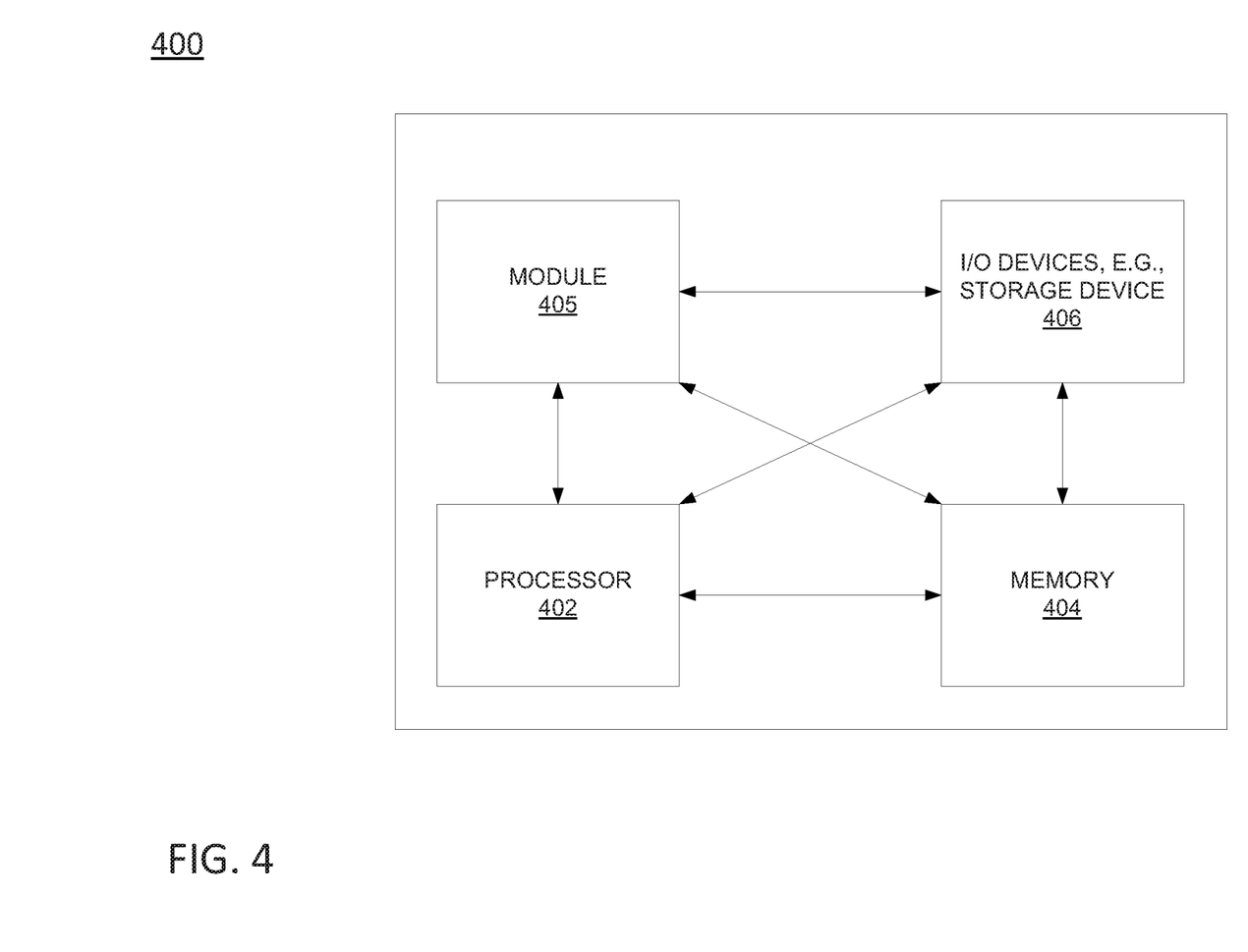
FIG. 4 illustrates a high-level block diagram of a computing device specially programmed to perform the functions described herein.

FIG. 4 depicts a high-level block diagram of a computing device or processing system specifically programmed to perform the functions described herein. For example, any one or more components or devices illustrated in FIG. 1 or described in connection with the method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for assigning packets to a flow in a telecommunication network, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for assigning packets to a flow in a telecommunication network (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for assigning packets to a flow in a telecommunication network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a first packet including a first header from a network tap deployed on at least one link of a telecommunication network;
decapsulating, by the processing system, a plurality of fields of the first header, the plurality of fields including a tunnel identifier field, a source port identifier field, and at least one additional field;
determining, by the processing system, a first tunnel identifier from the tunnel identifier field, a first source port identifier from the source port identifier field, and a first value from the at least one additional field;
assigning, by the processing system, the first packet to a first flow based on the first tunnel identifier, the first source port identifier, and the first value;
determining, by the processing system, an offset of the tunnel identifier field and an offset of the source port identifier field;
obtaining, by the processing system, a second packet including a second header from the network tap;
extracting, by the processing system, a second value from a tunnel identifier field of the second header using the offset of the tunnel identifier field and a third value from a source port identifier field of the second header using the offset of the source port identifier field, without decapsulating the second packet;
determining, by the processing system, that the second value matches the first tunnel identifier and that the third value matches the first source port identifier;
assigning, by the processing system, the second packet to the first flow in response to the determining that the second value matches the first tunnel identifier and that the third value matches the first source port identifier, wherein the assigning is performed without determining whether any values associated with any additional fields of the second header in addition to the tunnel identifier field and the source port identifier field match any identifiers of the plurality of fields in addition to the tunnel identifier field and the source port identifier field of the first packet;

obtaining, by the processing system, a third packet including a third header;

extracting, by the processing system, at least one value from a field of the third header in accordance with at least one of: the offset of the tunnel identifier field or the offset of the source port identifier field;

determining, by the processing system, that the at least one value does not match the at least one of: the first tunnel identifier or the first source port identifier; and determining, by the processing system, that the third packet does not belong to the first flow in response to the determining that the at least one value does not match the at least one of: the first tunnel identifier or the first source port identifier.

2. The method of claim 1, wherein the first flow is characterized by the first tunnel identifier and the first source port identifier.

3. The method of claim 1, wherein the offset of the tunnel identifier field comprises a number of data units from a start of the first packet to a start of the tunnel identifier field.

4. The method of claim 3, wherein the offset of the source port identifier field comprises a number of bits from a start of the first packet to a start of the source port identifier field.

5. The method of claim 1, further comprising:
assigning the third packet to a second flow in response to the determining that the third packet does not belong to the first flow.

6. The method of claim 5, further comprising:
determining a second tunnel identifier and a second source port identifier from a plurality of fields of the third header, wherein the second flow is characterized by the second tunnel identifier and the second source port identifier.

7. The method of claim 1, wherein the first tunnel identifier comprises a general packet radio service tunnel identifier.

8. The method of claim 1, wherein the source port identifier field comprises a transport layer protocol header field.

9. The method of claim 8, wherein the transport layer protocol header field comprises:
a uniform datagram protocol header field; or
a transmission control protocol header field.

10. The method of claim 1, wherein the extracting the second value and the third value from the second header is performed within a defined time window from the assigning of the first packet to the first flow.

11. The method of claim 10, further comprising:
reducing the defined time window when a collision probability between the first flow and at least a second flow exceeds a collision probability threshold.

12. The method of claim 11, wherein the collision probability comprises a rate at which packets from the at least the second flow comprising the first tunnel identifier and the first source port identifier are detected within the defined time window.

13. A non-transitory computer-readable medium storing instructions which, when executed by a processing system including at least one processor, cause the processing system to perform operations, the operations comprising:

obtaining a first packet including a first header from a network tap deployed on at least one link of a telecommunication network;

decapsulating a plurality of fields of the first header, the plurality of fields including a tunnel identifier field, a source port identifier field, and at least one additional field;

determining a first tunnel identifier from the tunnel identifier field, a first source port identifier from the source port identifier field, and a first value from the at least one additional field;

assigning the first packet to a first flow based on the first tunnel identifier, the first source port identifier, and the first value;

determining an offset of the tunnel identifier field and an offset of the source port identifier field;

obtaining a second packet including a second header from the network tap;

extracting a second value from a tunnel identifier field of the second header using the offset of the tunnel identifier field and a third value from a source port identifier field of the second header using the offset of the source port identifier field, without decapsulating the second packet;

determining that the second value matches the first tunnel identifier and that the third value matches the first source port identifier;

assigning the second packet to the first flow in response to the determining that the second value matches the first tunnel identifier and that the third value matches the first source port identifier, wherein the assigning is performed without determining whether any values associated with any additional fields of the second header in addition to the tunnel identifier field and the source port identifier field match any identifiers of the plurality of fields in addition to the tunnel identifier field and the source port identifier field of the first packet;

obtaining a third packet including a third header;

extracting at least one value from a field of the third header in accordance with at least one of the offset of the tunnel identifier field or the offset of the source port identifier field;

determining that the at least one value does not match the at least one of the first tunnel identifier or the first source port identifier; and determining that the third packet does not belong to the first flow in response to the determining that the at least one value does not match the at least one of the first tunnel identifier or the first source port identifier.

14. A device comprising:
a processing system including at least one processor; and
a non-transitory computer-readable medium storing instructions which, when executed by the processing system, cause the processing system to perform operations, the operations comprising:
obtaining a first packet including a first header from a network tap deployed on at least one link of a telecommunication network;
decapsulating a plurality of fields of the first header, the plurality of fields including a tunnel identifier field, a source port identifier field, and at least one additional field;

determining a first tunnel identifier from the tunnel identifier field, a first source port identifier from the source port identifier field, and a first value from the at least one additional field;

assigning the first packet to a first flow based on the first tunnel identifier, the first source port identifier, and the first value;

determining an offset of the tunnel identifier field and an offset of the source port identifier field;

obtaining a second packet including a second header from the network tap;

extracting a second value from a tunnel identifier field of the second header using the offset of the tunnel identifier field and a third value from a source port identifier field of the second header using the offset of the source port identifier field, without decapsulating the second packet;

determining that the second value matches the first tunnel identifier and that the third value matches the first source port identifier;

assigning the second packet to the first flow in response to the determining that the second value matches the first tunnel identifier and that the third value matches the first source port identifier, wherein the assigning is performed without determining whether any values associated with any additional fields of the second header in addition to the tunnel identifier field and the source port identifier field match any identifiers of the plurality of fields in addition to the tunnel identifier field and the source port identifier field of the first packet;

obtaining a third packet including a third header;

extracting at least one value from a field of the third header in accordance with at least one of the offset of the tunnel identifier field or the offset of the source port identifier field;

determining that the at least one value does not match the at least one of the first tunnel identifier or the first source port identifier; and determining that the third packet does not belong to the first flow in response to the determining that the at least one value does not match the at least one of the first tunnel identifier or the first source port identifier.

15. The method of claim 1, wherein the first packet and the second packet both comprise packets of data plane traffic.

16. The method of claim 1, wherein the network tap copies traffic on a link between components of the telecommunications network.

17. The method of claim 16, wherein the network tap provides traffic that is copied, including the first packet, the second packet, and the third packet, to the processing system.

18. The method of claim 17, wherein the traffic that is copied comprises data plane traffic.

* * * * *